(12) United States Patent
Chen

(10) Patent No.: US 6,952,527 B2
(45) Date of Patent: Oct. 4, 2005

(54) APPARATUS FOR RELEASING FLASH DEVICE AUTOMATICALLY

(75) Inventor: Gyia-Yen Chen, Hsin-Chu Science-Based Industrial Park (TW)

(73) Assignee: Mustek Systems Inc., (TW)

( * ) Notice: Subject to any disclaimer, the term of this patent is extended or adjusted under 35 U.S.C. 154(b) by 0 days.

(21) Appl. No.: 10/751,457

(22) Filed: Jan. 6, 2004

(65) Prior Publication Data
US 2005/0147405 A1 Jul. 7, 2005

(51) Int. Cl.[7] ............................................. G03B 15/03
(52) U.S. Cl. ...................... 396/165; 396/177
(58) Field of Search ................... 396/165, 176–178

(56) References Cited

U.S. PATENT DOCUMENTS 4,545,667 A * 10/1985 Niwa et al. ................. 396/165

* cited by examiner

Primary Examiner—David M. Gray
(74) Attorney, Agent, or Firm—Lowe Hauptman & Berner, LLP

(57) ABSTRACT

The present invention relates to a built-in flash mechanism that will pop up when the illumination is insufficient or it is manually switched on. The present invention comprises a flash unit having a buckle, a driving motor, a driving gear set formed on said driving motor, a axle wheel portion having a clip, a driven gear set formed on said axle wheel portion, a light-sensitive sensor, and a pusher for obstructing light into said light-sensitive sensor. When the light is obstructs by the pusher, the sensor will activate the driving motor to release the flash device or lock the flash unit at a receiving chamber.

10 Claims, 4 Drawing Sheets

APPARATUS FOR RELEASING FLASH DEVICE AUTOMATICALLY

BACKGROUND OF THE INVENTION

1. Field of the Invention

The present invention relates to a built-in flash mechanism that can be implemented in a digital camera, a conventional camera or other video devices. By a step motor to drive a clip to release a buckle, the present is able to flick the flash up when the illumination is insufficient or it is manually switched on. With this method, a power-save, easy-to-use, and simple flash pop-up mechanism can be achieved.

2. Background Description

There are at least four types of flashlights utilized in cameras. They are hand-held, top-attachable, built-in and standalone flashlight devices. Among all types of flash units, built-in flashes are popular in both digital and conventional cameras. For built-in flashes, there are two types available: fixed and pop-up flashes. The present invention is a built-in pop-up flash, which will popup manually, or pop-up when insufficient illumination is detected.

In addition, the existing built-in pop-up flash unit utilizes a two-way electromagnetic valve, which has drawbacks, such as complicated structure and large force needed to hold the flash inside the camera housing or to pop up the flash, requiring larger activation force. Besides, the necessary current of the two-way electromagnetic valve is larger, thus consuming the precious battery power.

To surmount the drawbacks aforementioned, the present invention utilizes a motor to lock the flashlight unit and further utilizes elasticity of a spring to release the flashlight unit when the motor unlocks it. Thus, a less power consumption and easy-to-use with simple structure of the flash device is achieved.

SUMMARY OF THE INVENTION

It is therefore an object of the present invention to provide a flash device beneficially from a less power consumption and easy-to-use with the simple structure.

The present invention provides a built-in auto pop-up flash mechanism which comprises a flash unit having a buckle, a driving motor, a driving gear set, formed on said driving motor, an axle wheel portion having a clip, a driven gear set, formed on the axle wheel portion, a light-sensitive sensor, and a pusher for obstructing light into said light-sensitive sensor, wherein when the pusher obstructs light, said light-sensitive sensor activates the driving motor to rotate the clip to lock the buckle by engagement of the driving gear set and the driven gear set.

It is another aspect of the present invention to provide a flash device mechanism that the camera is therefore able to be dust-protected, water-resistance and easy hand-carry.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The following is a description of the present invention. However, other than the detailed description, the present invention can also be widely implemented in other embodiment, and the scope of the present invention is not limited and is based on the future patent scope.

Figure 1:
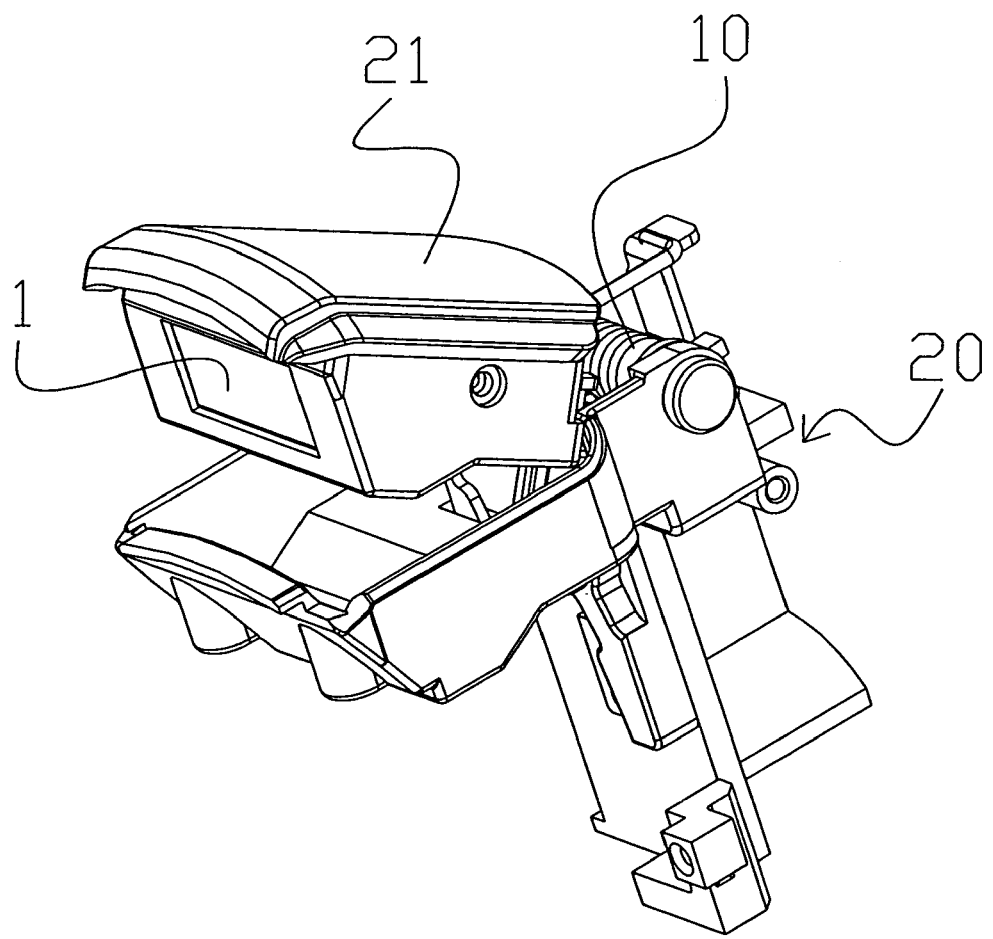
FIG. 1 shows the schematic appearance view of the built-in flash device in an open status.
Figure 2:
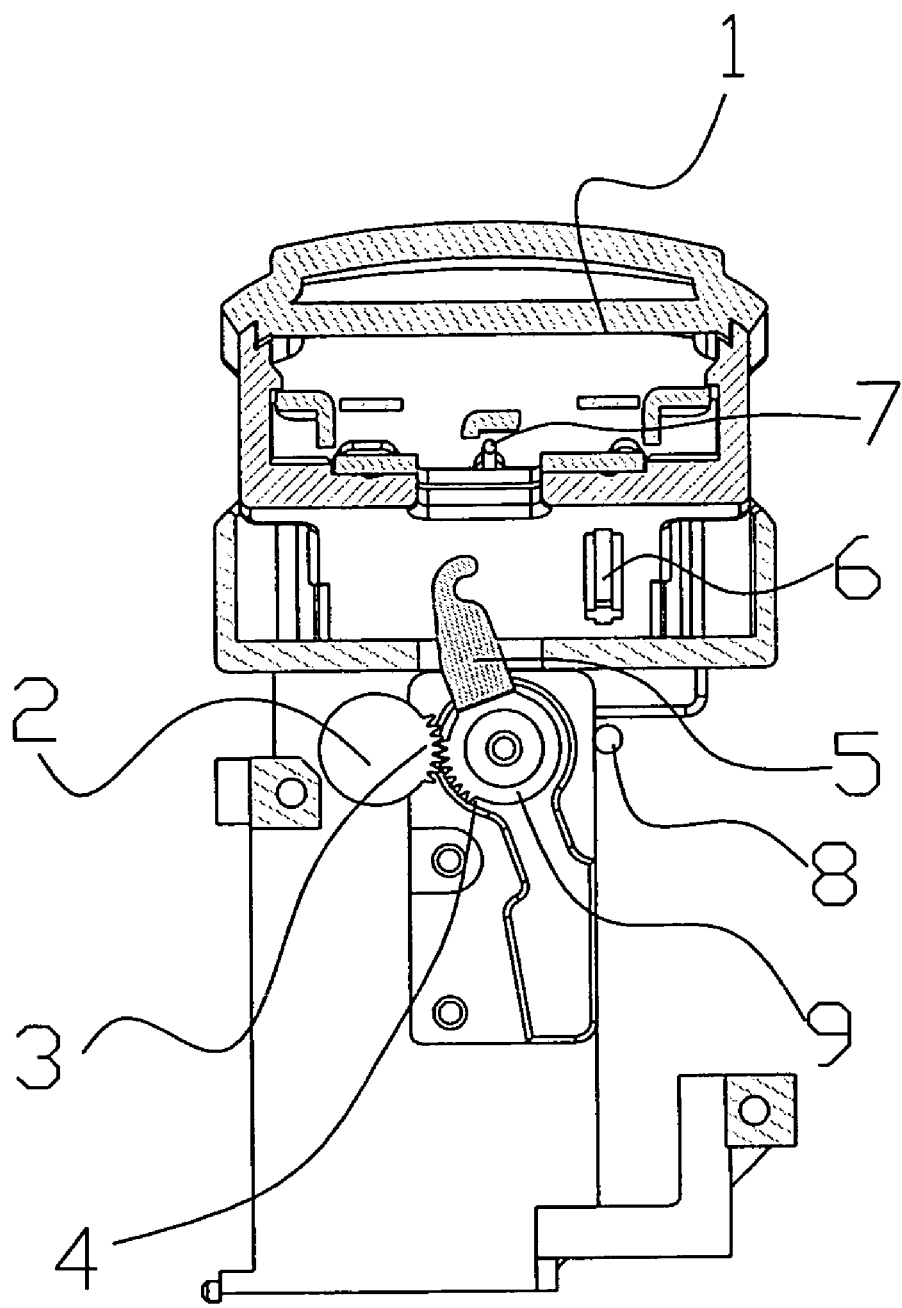
FIG. 2 shows the cross-sectional view of the flash device in an open status.

The present invention is illustrated in FIGS. 1 and 2, which are illustrations of the flash device 20 when the flash unit 1 under the flash cover 21 is open by the bias of a spring 10. FIG. 2 shows the cross sectional view of the embodiment. It is shown that the present invention at least includes a flash unit 1, a driving motor 2, an axle wheel portion 9, a sensor 8, a clip 5 for hooking on a buckle 7. The clip 5 is connected to the axle wheel portion 9 and the buckle 7 is formed on the flash unit 1.

Figure 3:
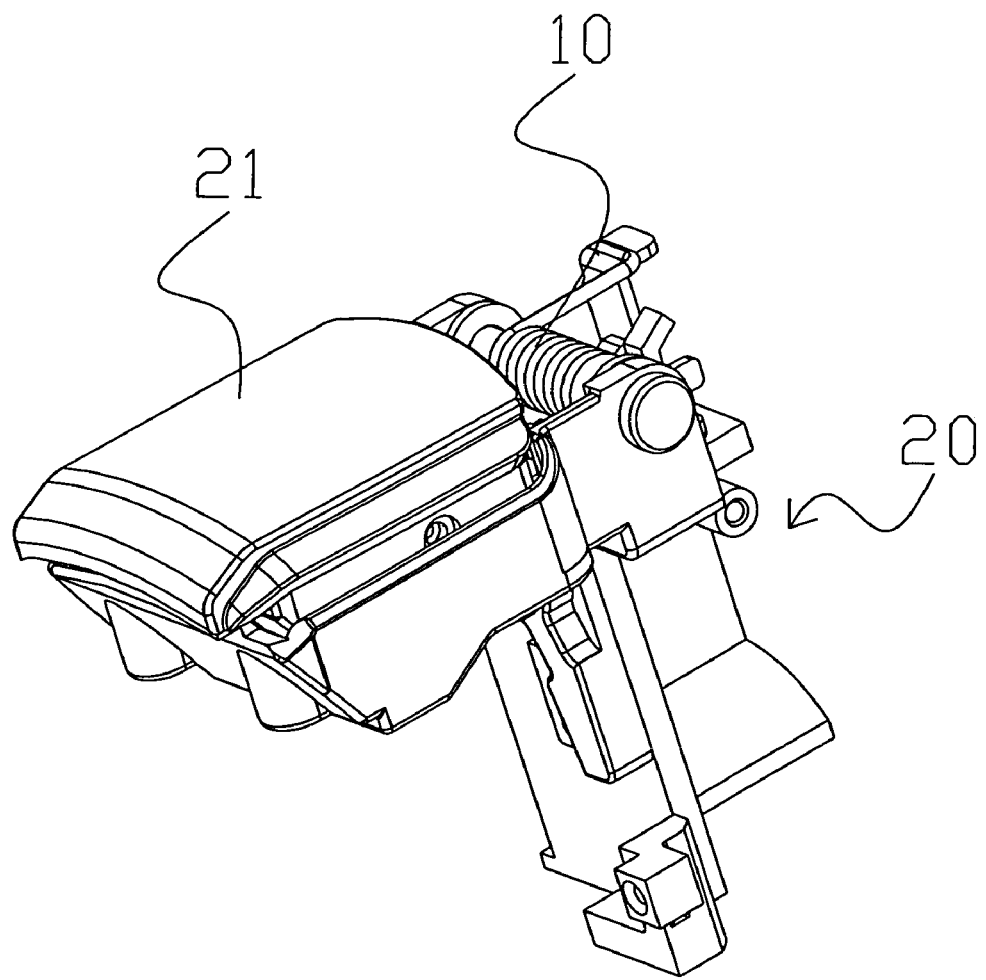
FIG. 3 shows the schematic appearance view of the flash device in a close status.
Figure 4:
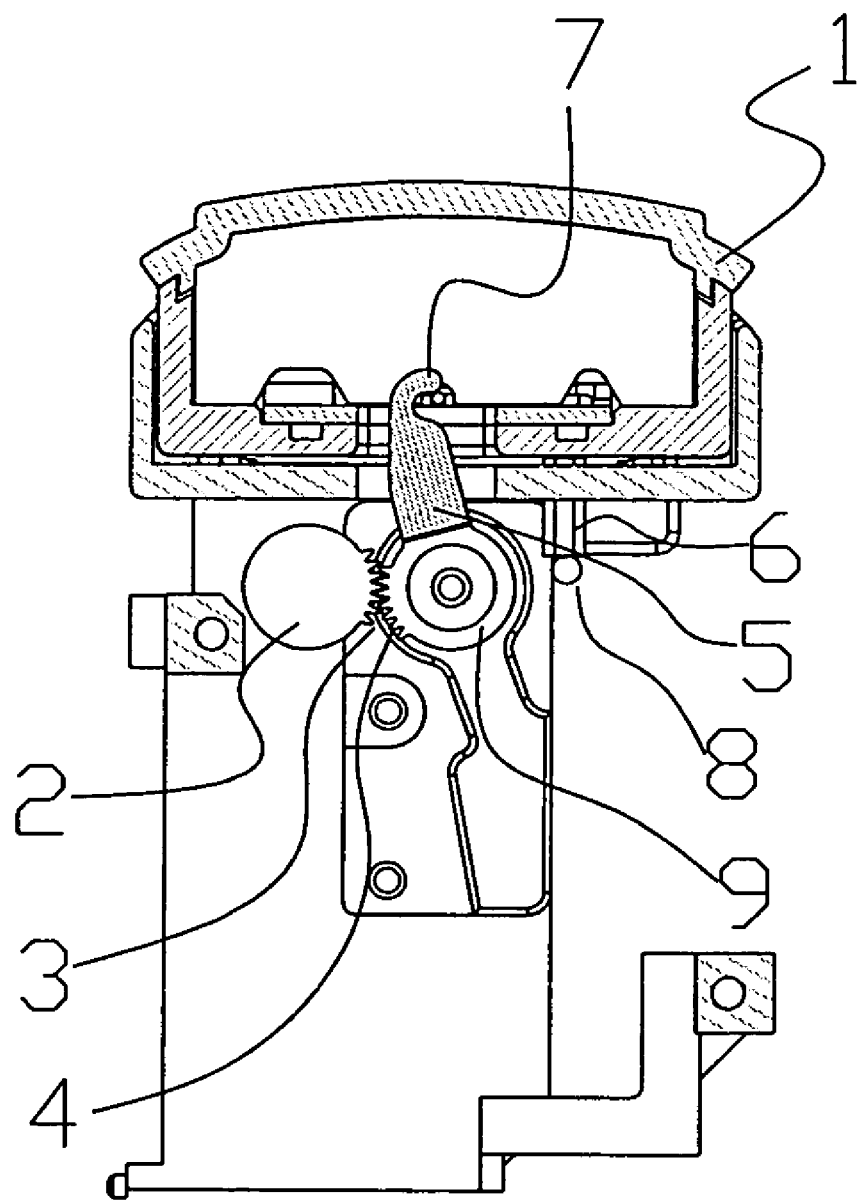
FIG. 4 shows the cross-sectional view of the embodiment of the flash device which is in a close status.

Firstly, a driving gear set 3 is formed on the driving motor 2 and a driven gear set is formed on the axle wheel portion 9. When a user is pushing down the flash unit 1, a pusher 7 formed on the flash unit 1 is able to move down to activate the sensor 8. In this case, the driving motor 2 rotates. Since the driving motor 2 is rotating counterclockwise, the axle wheel portion will rotate clockwise by the help of engagement of the driving gear set 3 and the driven gear set 4. Therefore, the clip 5 is able to move rightward to lock the buckle 7. The close status of the flash unit 1 is thereby achieved, as shown in FIGS. 3 and 4. Once the flash unit 1 is closed, the driving motor 2 may be discharged to save power. The driving motor 2 is better to be a step motor to do precise rotation.

When the illumination is inefficient or under the command of the user by pushing a button, the camera or a digital camera will activate the flash unit. When the activation signal is sent by the camera, the flash unit will be charged to provide flash and the driving motor 2 will rotate clockwise. Therefore, the axle wheel portion 9 rotates counterclockwise because of the engagement of the driving gear set 3 and the driven gear set 4, for moving the clip 5 leftward. In this case, the clip 5 releases the buckle 7 of the flash unit 1. Therefore, the flash unit 1 is able to pop up for providing more illumination, by the elastic force of the spring 10, as shown in FIGS. 1 and 2.

By the different placement and connection of the clip 5, it is able to achieve that clip 5 locks the buckle 7 when clip 5 moves leftward. Besides, the sensor 8 may be a light-sensitive sensor. In this case, when the pusher 6 blocks the light into the light-sensitive sensor 8, the driving motor 2 is activated to hook the flash unit 1 at a close status. The sensor 8 may also be simple click-switch. The pusher 6 is actually pushing down the sensor for switching on/off in order to active the driving motor 2.

By the utilization of the built-in automatically pop-up flash device, the body of the camera can be designed silky and fashion-stylish. When the closed status of the flash unit 1 is achieved, the camera is therefore able to be dust-protected, water-resistance and easy hand-carry.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. An apparatus for releasing a flash device, comprising:
    a flash unit;
    a clipping device for locking said flash unit;
    a rotation device having:
        a driving motor,
        a driving gear set formed on said driving motor,
        an axle wheel portion which is connected to said clipping device, and
        a driven gear set formed on said axle wheel portion; and
    a sensor for activating said rotation device.

2. The apparatus of claim 1, wherein said driving motor is a step motor.

3. The apparatus of claim 1, wherein said clipping device comprises:
    a clip connected to said axle wheel portion and a buckle formed on said flash unit.

4. The apparatus of claim 3, wherein said driving motor rotates counterclockwise to move said clip to lock on said buckle by engagement of said driving gear set and said driven gear set.

5. The apparatus of claim 3, wherein said driving motor rotates clockwise to move said clip to release said buckle by engagement of said driving gear set and said driven gear set.

6. The apparatus of claim 5 further comprising a spring for providing elastic force to pop up said flash unit when said clip releases said buckle.

7. The apparatus of claim 1, wherein said sensor is a light-sensitive sensor.

8. The apparatus of claim 3, further comprising a pusher to obstruct light into said light-sensitive sensor.

9. An apparatus for releasing a flash device, comprising:
    a flash unit having a buckle;
    a driving motor;
    a driving gear set, formed on said driving motor;
    an axle wheel portion having a clip;
    a driven gear set, formed on said axle wheel portion;
    a light-sensitive sensor; and
    a pusher for obstructing light into said light-sensitive sensor,
    wherein when said pusher obstructs light, said light-sensitive sensor activates said driving motor to rotate said clip to lock said buckle by engagement of said driving gear set and said driven gear set.

10. The apparatus of claim 9, wherein said driving motor is a step motor for providing precise rotation.

* * * * *